United States Patent [19]

Moura et al.

[11] Patent Number: 4,909,460

[45] Date of Patent: Mar. 20, 1990

[54] DEVICE AND METHOD FOR AIMING A SPACE PROBE TOWARD A CELESTIAL BODY

[75] Inventors: Denis Moura, Toulouse; Louis Torres, Castanet, both of France

[73] Assignee: Centre National D'Etudes Spatiales, Paris, France

[21] Appl. No.: 194,380

[22] Filed: May 16, 1988

[30] Foreign Application Priority Data

May 22, 1987 [FR] France ................................ 87 07221

[51] Int. Cl.$^4$ .............................................. B64G 1/24
[52] U.S. Cl. .................... 244/164; 244/165; 244/168; 244/169; 244/171; 244/172
[58] Field of Search .................. 244/158 R, 164, 165, 244/168, 169, 172, 171, 176

[56] References Cited

U.S. PATENT DOCUMENTS 4,732,354  3/1988  Lievre ................................. 244/168
4,767,084  8/1988  Chan et al. ........................ 244/164

Primary Examiner—Sherman D. Basinger
Assistant Examiner—Anne Sartelle
Attorney, Agent, or Firm—Nixon & Vanderhye

[57] ABSTRACT

Device and method for aiming a space probe toward a celestial body. It comprises a solar sail (30, 31) having an asymmetry about an axis (Z) and which subjects the probe (S) to a tilting torque of solar pressure. A kinetic wheel (20) turns about a perpendicular axis (X). This results in a rotation of the probe about the axis perpendicular to the two preceding axes (Y). The rotational speed of the wheel (20) is varied by a control system (23, 24) in order to change the rotational speed of the probe.

Application of the invention is to space probes that lie in the plane of the ecliptic.

7 Claims, 2 Drawing Sheets

DEVICE AND METHOD FOR AIMING A SPACE PROBE TOWARD A CELESTIAL BODY

BACKGROUND OF THE INVENTION

1. Field of the Invention

The present invention relates to a device and a method for aiming a space probe toward a celestial body.

2. Description of the Prior Art

Space probes for observing the Solar System travel in orbits which lie substantially in the plane of the ecliptic in which the various planets are located. It is important to aim one predetermined face of these probes toward a celestial body, which in particular may be the Sun or the Earth, if this face carries solar cells or a fixed antenna. Probes that are stabilized on three axes, that is, that do not themselves rotate, undergo an orientational drift because of displacements of the probe and of the celestial body in their orbits, which one attempts to correct by a rotation about the axis perpendicular to the plane of their orbits.

Heretofore, only motive devices such as gas jets, which operate discontinuously and which quickly carry out point-shaped corrections of orientation, have been used. Sensors for the position of the relevant celestial body indicate when the aim is once again perfect. Such devices have the disadvantage of having to be utilized relatively frequently and of requiring a power consumption which is not negligible.

SUMMARY OF THE INVENTION

The invention relates to an improvement of such aiming devices: it utilizes solar winds to cause a continuous variation of orientation between two corrective operations in conjunction with an on-board kinetic wheel. This improvement permits corrections to be much less substantial as well as less frequent.

More particularly, the present invention relates to a device for aiming a space probe toward a celestial body by rotating the probe about a first axis, which device comprises a sensor for the position of the celestial body and a first motive system, both being connected to a first control system, characterized in that it comprises moreover: a kinetic wheel which turns about a second axis orthogonal to the first axis; a solar sail assembly which receives solar pressure from the Sun and which causes a resultant effect on the probe which includes a torque about a third axis, orthogonal to the first and second axes, as well as a variable-speed drive for the kinetic wheel, and a second motive system which imparts a rotation to the probe about the second axis, both being connected to a second control system which knows the value of the solar pressure and the rotational speed which is to be imparted to the probe about the first axis.

The solar sail assembly has a particular shape. Two principal types can be distinguished: one in which the solar sail assembly has an asymmetry with respect to the third axis, and one in which the solar sail assembly is oriented obliquely toward the Sun.

The invention also relates to a method of utilizing the aiming device embodying the invention, the probe being previously aimed toward the celestial body, characterized in that it consists of successively:

evaluating the rotational speed to be imparted to the probe to maintain the aim;

adjusting the rotational speed of the kinetic wheel by the variable-speed drive, while avoiding rotation of the probe about the second axis by actuating the second motive system;

interrupting all corrective action for a predetermined time; and periodically correcting, in a manner known in itself, the aim of the probe by actuating the first motive system.

BRIEF DESCRIPTION OF THE DRAWINGS

The invention will now be described with reference to the accompanying drawings, which are presented for purposes of illustration and not of limitation.

DETAILED DESCRIPTION OF PREFERRED EMBODIMENTS

Figure 1:
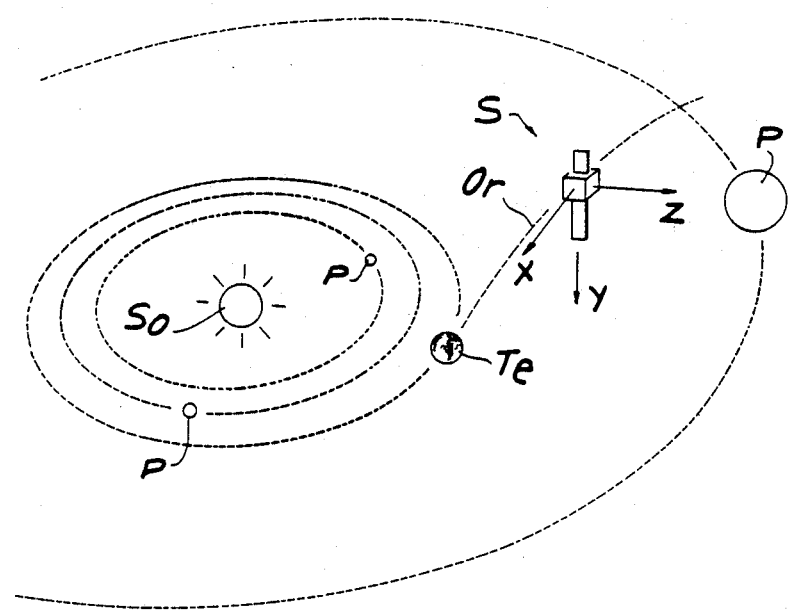
FIG. 1 is a general view of the orbit of a space probe in the Solar System, for explaining the problem that is presented.

First of all, FIG. 1 shows the Solar System: the Sun So, various planets P, and the Earth Te. The Earth Te and the other planets P revolve, as is well known, around the Sun So following orbits that are substantially within the plane of the ecliptic.

A probe S is launched from the Earth Te following an orbit Or. It is intended to pass in proximity to one or more planets P and its orbit Or also lies substantially within the plane of the ecliptic.

Therefore, it is desirable for the same face of the probe S always to be oriented toward a certain celestial body. This celestial body may be, as is the case in FIG. 1, the Earth Te, to maintain radio communications in the event the probe S is provided with a fixed antenna. Plausibly, it may also be the Sun So, to assure good exposure for the photocells.

A trihedral comprising axes X, Y, Z, is defined with respect to the probe S: the axes X and Z are in the plane of the orbit Or and, accordingly, the axis Y is perpendicular thereto. The problem, in brief, is to aim the axis X toward the relevant celestial body by imparting a rotation about the axis Y to the probe S. This may be done successfully by means of the device described with reference to FIG. 2.

The devices of prior art comprise, first of all, a sensor for the position of the celestial body toward which the probe S must be oriented. This sensor is designated 10 and may consist of a mosaic of photovoltaic cells having a spatial field of vision several degrees in width, whose signals permit a reconstruction of the image of the celestial body. It also comprises two gas jets 11 and 11' which exert directional thrust on the probe S along the axis X and in opposite directions. These gas jets are disposed on two opposite faces of the probe S so as to create a torque about the axis Y. Finally, the device comprises a first control system 12. The whole device operates in a discontinuous manner: the first control system 12 tracks the orientational drift of the probe S by means of the sensor 10, to which it is connected by a line 13. When this drift attains a limit value, or well before attaining this limit and at predetermined intervals triggered by a time-measurement system incorporated therein, the first control system 12 activates the gas jets 11 and 11' by means of, respectively, lines 14 and 14' until the orientation of the probe S is perfectly corrected.

The orientational drift of the probe S is produced primarily by the relative displacement of the probe S and the associated celestial body. Accordingly, this relative displacement is perfectly predictable, since the position of the probe S and that of the celestial body toward which it must be oriented are always available in the form of tables or ephemerides. The object of the invention is to provide a system which anticipates the orientational drift and corrects it continually, and which only utilizes the above-described system for complementary corrections much less substantial than the corrections for which it has been employed up to the present.

Figure 2:
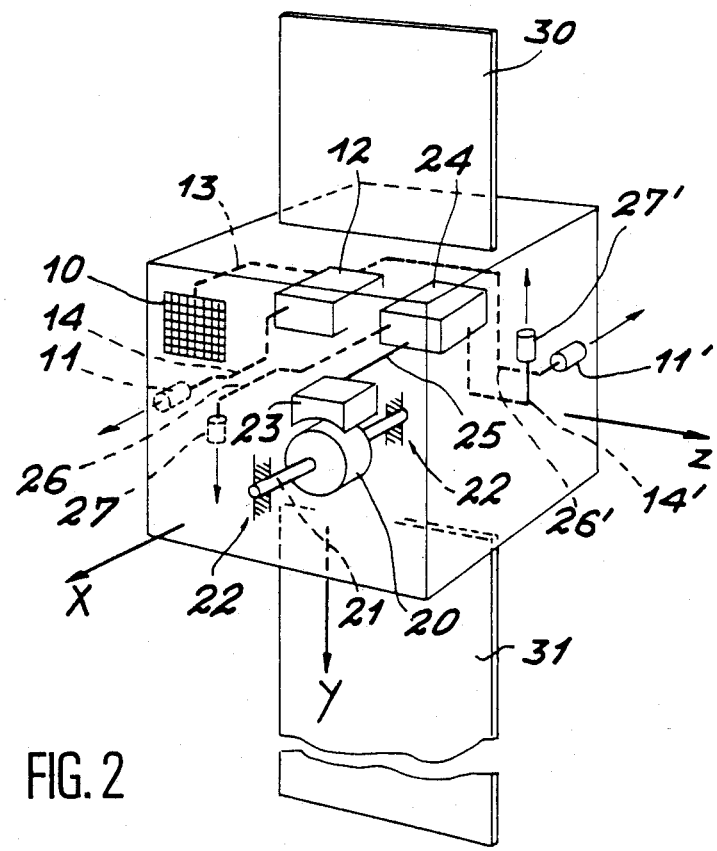
FIG. 2 shows one possible mode of carrying out the invention.

According to the particular mode of carrying out the invention described in FIG. 2, a kinetic wheel, turning at high speed about the axis X, is disposed within the probe S. This kinetic wheel is designated 20 and is connected by means of a rotating shaft 21 to journals 22 secured to the probe S. The rotational speed of the wheel 20 may be modified by means of a variable-speed drive 23 consisting of a stator disposed in proximity to the wheel 20 and which exerts electromagnetic forces on the wheel 20 and is capable of either accelerating or braking the wheel 20. The variable-speed drive 23 is controlled by a second control system 24 by means of a line 25. The second control system 24 is connected by lines 26 and 26' to gas jets 27 and 27', which it also activates. The gas jets 27 and 27' exert thrust in opposite directions along the axis Y; they are disposed on two opposite faces of the probe, so that their resultant is a torque about the axis X.

The aiming device also comprises two solar sails 30 and 31, which are secured to two opposite faces of the probe S, and extend from the probe essentially in the direction defined by the axis Y. The solar sails 30 and 31 are asymmetric, one of them, 31 in this case, having a greater surface area. The solar pressure exerted on the solar sails 30 and 31 accordingly has a resultant effect which comprises a tilting torque on the probe S about the axis Z.

The mutual presence of a solar sail assembly, which is asymmetric with respect to an axis Z, and a kinetic wheel 20 turning about another axis X, produces a rotation of the whole probe about an axis orthogonal to the latter two axes, namely, the axis Y. This precession movement has a speed that is proportional to the solar radiation pressure exerted on the sails 30 and 31, and to the amount of asymmetry between the two sails 30 and 31 (the difference in surface area and the orientation of this difference), and is inversely proportional to the kinetic movement of the wheel 20, that is, to its speed of rotation. In the embodiment described herein, the second control system calculates at predetermined intervals the rotational speed about the axis Y that must be obtained in order to maintain a satisfactory aim toward the celestial body. It knows the position of the probe S with respect to the Sun So and, accordingly, can determine the value of the solar pressure Ps at this time and in this location by the formula $PS = Po/D^2$, where Po is equal to $4.73 \times 10^{-6}$ newtons/m$^2$, and where D is the distance between the probe S and the Sun So in astronomical units (1 astronomical unit = 150 million kilometers). Finally, the second control system 24 calculates the rotational speed of the kinetic wheel that will permit the desired precession speed about the axis Y to be obtained and accordingly actuates the variable-speed drive 23 to change the rotational speed of the kinetic wheel 20. This last action, however, results in a rotation of the whole probe S about the axis X, which is corrected by an ejection of gas from the gas jets 27 and 27'.

The precession rotation about the axis Y then continues, without operating the control system 24.

The two control systems 12 and 24 may remain independent of each other. The first control system 12 is now used only as a complementary system for enabling the orientation to be completed and is utilized at predetermined intervals, for example, just before the second control system 24 resumes its calculations and its corrective operations.

Figure 3:
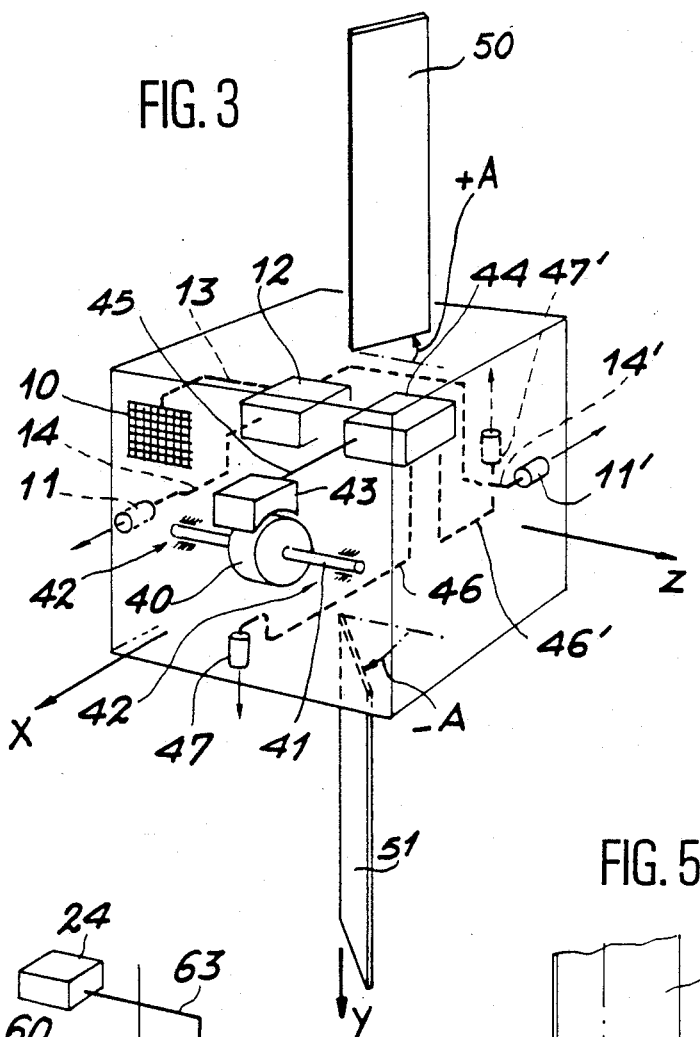
FIG. 3 shows an equivalent mode of carrying out the invention.

Another equivalent embodiment of the invention will be described with reference to FIG. 3.

This embodiment has numerous resemblances to the preceding one: seen once again are the sensor 10, the first control system 12, and the system of gas jets 11 and 11'; also seen again are a kinetic wheel 40 on an axis 41 turning in two journals 42 secured to the probe S, controlled by a variable-speed drive 43 connected to a second control device 44 by a line 45. The difference between the wheel 20 and the wheel 40 is that the latter rotates about the axis Z. The second attitude control system 44 controls, by means of lines 46 and 46', two gas jets 47 and 47' disposed on opposite faces of the probe S, which exert thrust thereon along the axis Y and in opposite directions so as to produce a torque on the probe about the axis Z.

In this embodiment of the invention, the probe S comprises two solar sails 50 and 51 extending in the direction Y from two opposite faces of the probe S to which they are secured. The shape of these sails 50 and 51 is similar in this embodiment, but their angular orientation is different: they enclose angles with the plane defined by the axes Y and Z, having equal absolute values and opposite signs. These angles are designated $+A$ and $-A$ for the two solar sails 50 and 51, respectively. The solar pressure which is exerted on these solar sails 50 and 51 therefore has a resultant effect which includes a torque about the axis X.

Accordingly, this solar sail assembly 50, 51 and the kinetic wheel 40, for the same reason as in the other embodiment described hereinabove, produces a precession movement about an axis perpendicular to the axis of asymmetry of the solar sail assembly, here the axis X, and perpendicular to the axis of rotation of the kinetic wheel 40, here the axis Z, that is, about the axis Y. As in the preceding embodiment, a precession movement having a desired speed is created by adjusting the rotational speed of the kinetic wheel 40 and likewise it is necessary to then correct the inclination undergone by the probe about the axis Z by means of gas jets 47 and 47'.

Several modifications may be applied to the embodiments which have been described hereinabove. First of all, the control system 24 and 44, as well as the first control system 12, may be in part located on Earth: the calculations and decisions are made outside the probe S and it is then only necessary to transmit them by means of a telecommunications system.

It is also possible to utilize the invention with variable-geometry sails. This is shown in FIGS. 4 and 5.

Figure 4:
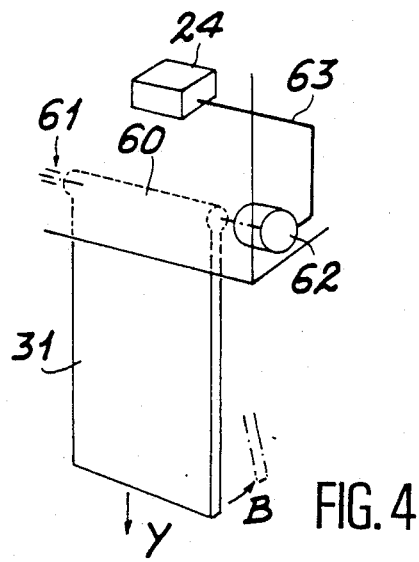

In FIG. 4, one of the solar sails 31 of the first embodiment is no longer secured to the probe, but can pivot with respect thereto. Its end is now traversed by a rod 60, one end of which is inserted into a bearing 61 secured to the probe S, and the other end of which is rotated by means of a motor 62, which is also secured to the probe S and is controlled by the second control system 24 by means of a line 63. This arrangement permits the solar sail 31 to be more or less folded on the probe S by changing the angle G it encloses with the axis Y. Accordingly, it is possible to modify the asymmetry of the solar sail system and the torque about the axis Z.

Figure 5:
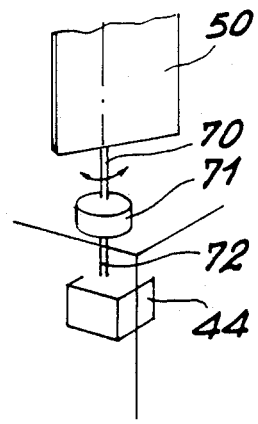
FIGS. 4 and 5 show modifications that can be applied to FIGS. 2 and 3, respectively.

As shown in FIG. 5, a variable asymmetry can likewise be applied to the solar sails 50 and 51 of the second embodiment. They can be pivotally mounted at the top of a small mast 70 that is rotated by a motor 71 controlled by the second control system 44 by means of a line 72: thus, the angle +A or −A the solar sails 50 and 51 enclose with the axis Z can be varied. In this case, it is desirable for the two solar sails 50 and 51 to be equipped with the same device and controlled simultaneously, so that their orientation toward the axis Z remains symmetrical. The result is analogous to that produced by the device of FIG. 5: the value of the torque due to the solar pressure, here about the axis X, is changed.

The modifications shown in FIGS. 4 and 5, however, introduce complications into the overall assembly and are less reliable. For this reason, if the specific problem permits, it is preferred to adhere to the embodiments of FIGS. 2 and 3.

In any case, the device which constitutes the subject matter of this invention increases economy and security, in comparison to previous devices, without greatly complicating the space probe, since the kinetic wheels and the gas jets certainly exist already for other purposes.

We claim:

1. Device for aiming a space probe toward a celestial body by rotating the probe (S) about a first axis (Y), said device comprising:
   a sensor (10) for sensing the position of the celestial body;
   a first control system (12);
   a first motive system (11, 11'), responsive to said first control system (12) for rotating said probe about said first axis (Y);
   a kinetic wheel (20, 40) which turns about a second axis (X or Z) orthogonal to the first axis (Y);
   a solar sail means (30, 31, 50, 51) responsive to solar pressure from the Sun (So), for causing a resultant effect on the probe (S) which includes a torque about a third axis (Z or X) orthogonal to the first and second axes (X or Z);
   a variable-speed drive means (23, 43) for varying the rotational velocity of said kinetic wheel (20, 40);
   a second motive system (27, 27', 47, 47') which imparts a rotation to the probe (S) about the second axis (X or Z); and
   a second control system (24, 44) responsive to said sensor, the value of the solar pressure (Ps) and the rotational speed which is to be imparted to the probe about the first axis (Y) for controlling said drive means to change the rotational velocity of said kinetic wheel thereby changing the movement of said probe about said first axis (Y) and for controlling said second motive system to counteract movement of said probe about said second axis (X or Z) caused by changes in the rotational velocity of said kinetic wheel.

2. The device for aiming a space probe as set forth in claim 1, characterized in that the torque is produced by an asymmetry of the solar sail (30, 31) with respect to the third axis (Z).

3. The device for aiming a space probe as set forth in claim 1, characterized in that the torque is generated by an oblique orientation of the solar sail (50, 51) with respect to the third axis (X).

4. The device for aiming a space probe as set forth in claim 1, characterized in that it comprises a mechanical system (60, 62, 70, 71) which deforms the solar sail in order to change the torque exerted on the probe (S) without varying the solar pressure.

5. A device for aiming a space probe toward a celestial body by rotating the probe about a first axis (Y), said device comprising:
   sensor means for determining a desired rate of movement about said first axis (Y);
   a kinetic wheel mounted for rotation about a second axis (X or Z);
   means for defining a center of solar pressure from the sun displaced from a center of gravity of said space probe, and for producing a torque about a third axis (Z or X);
   control system means for changing the rotational velocity of said wheel about said second axis; and
   motive means for counteracting any rotation of said probe about said second axis (X or Z) caused by changes in velocity of said kinetic wheel, whereby changes in the velocity of said kinetic wheel change the rate of movement about axis Y as said wheel is precessed by torque applied to the space probe about the third axis (Z or X), wherein said means for defining comprises a solar sail, characterized in that the torque is produced by an asymmetry of the solar sail (30, 31) with respect to the third axis (Z).

6. A device for aiming a space probe toward a celestial body by rotating the probe about a first axis (Y), said device comprising:
   sensor means for determining a desired rate of movement about said first axis (Y);
   a kinetic wheel mounted for rotation about a second axis (X or Z);
   means for defining a center of solar pressure from the sun displaced from a center of gravity of said space probe, and for producing a torque about a third axis (Z or X);
   control system means for changing the rotational velocity of said wheel about said second axis; and
   motive means for counteracting any rotation of said probe about said second axis (X or Z) caused by changes in velocity of said kinetic wheel, whereby changes in the velocity of said kinetic wheel change the rate of movement about axis Y as said wheel is precessed by torque applied to the space probe about the third axis (Z or X), wherein said means for defining comprises a solar sail, characterized in that the torque is generated by an oblique orientation of the solar sail (50, 51) with respect to the third axis (X).

7. A device for aiming a space probe toward a celestial body by rotating the probe about a first axis (Y), said device comprising:
   sensor means for determining a desired rate of movement about said first axis (Y);
   a kinetic wheel mounted for rotation about a second axis (X or Z);

means for defining a center of solar pressure from the sun displaced from a center of gravity of said space probe, and for producing a torque about a third axis (Z or X);

control system means for changing the rotational velocity of said wheel about said second axis; and motive means for counteracting any rotation of said probe about said second axis (X or Z) caused by changes in velocity of said kinetic wheel, whereby changes in the velocity of said kinetic wheel change the rate of movement about axis Y as said wheel is precessed by torque applied to the space probe about the third axis (Z or X), wherein said means for defining comprises a solar sail, characterized in that it comprises a mechanical system (60, 62, 70, 71) which deforms the solar sail in order to change the torque exerted on the probe (S) without varying the solar pressure.

* * * * *